(12) United States Patent
Werblud

(10) Patent No.: US 8,500,870 B2
(45) Date of Patent: Aug. 6, 2013

(54) BIOCOMPATIBLE, CORROSION-INHIBITING BARRIER SURFACE TREATMENT OF ALUMINUM FOIL

(76) Inventor: Marc S. Werblud, Seattle, WA (US)

(*) Notice: Subject to any disclaimer, the term of this patent is extended or adjusted under 35 U.S.C. 154(b) by 258 days.

(21) Appl. No.: 12/960,446

(22) Filed: Dec. 3, 2010

(65) Prior Publication Data
US 2012/0137886 A1 Jun. 7, 2012

(51) Int. Cl.
*B01D 53/22* (2006.01)

(52) U.S. Cl.
USPC .......... 96/4; 29/17.1; 29/17.3; 428/35.8; 428/606; 428/607

(58) Field of Classification Search
USPC .......... 29/17.1, 17.3; 96/4; 428/35.8, 606, 428/607
See application file for complete search history.

(56) References Cited

U.S. PATENT DOCUMENTS

| | | | |
|---|---|---|---|
| 4,308,084 A * | 12/1981 | Ohtusuki et al. | 156/233 |
| 4,431,710 A * | 2/1984 | Lifshin et al. | 428/650 |
| 4,751,488 A * | 6/1988 | Lanoue et al. | 336/84 R |
| 5,466,312 A | 11/1995 | Ward, Jr. et al. | |
| 5,627,435 A * | 5/1997 | Jansen et al. | 315/111.21 |
| 6,423,417 B1 | 7/2002 | Robbins | |
| 6,544,658 B2 | 4/2003 | Robbins | |
| 6,696,511 B2 | 2/2004 | Robbins | |
| 6,905,777 B2 * | 6/2005 | Near | 428/469 |
| 8,187,722 B2 * | 5/2012 | Nagatani et al. | 428/607 |
| 8,187,723 B2 * | 5/2012 | Matsunaga | 428/626 |
| 2003/0148136 A1 * | 8/2003 | Yamamoto et al. | 428/607 |
| 2005/0235838 A1 * | 10/2005 | Cohn | 99/426 |
| 2007/0207337 A1 * | 9/2007 | Nagatani | 428/607 |

* cited by examiner

*Primary Examiner* — Jason M Greene
*Assistant Examiner* — Anthony Shumate
(74) *Attorney, Agent, or Firm* — Mohr Intellectual Property Law Solutions, PC

(57) ABSTRACT

Methods of producing corrosion-inhibiting aluminum foil products suitable for culinary use involve metallurgical sequestration of aluminum radicals by applying a copper-containing barrier metal layer to a substrate aluminum foil, followed by application of a biocompatible, lipid-based sealant layer to seal any gaps in the barrier layer and provide a non-stick coating. The sealant, which has a vegetable cooking oil, or oil mixture, as its primary ingredient, may also function as a natural antimicrobial and/or anti-fungal agent. Various sealant additives may increase the thermal stability of the oil base, enhance the antimicrobial properties thereof, and increase shelf life. Aluminum foil products include a coated aluminum foil with a copper-containing barrier layer applied to an aluminum substrate layer, with a sealant layer applied to the barrier layer. The coated foil may be wound in a coil around a hollow tube which contains a desiccant.

20 Claims, 2 Drawing Sheets

BIOCOMPATIBLE, CORROSION-INHIBITING BARRIER SURFACE TREATMENT OF ALUMINUM FOIL

TECHNICAL FIELD

The disclosure relates to surface treatment of aluminum foil. In particular, the disclosure relates to methods of producing a corrosion-inhibiting culinary aluminum foil product that involve metallurgic sequestration of aluminum radicals by application of one or more barrier metal layers, including a copper layer, to one or both sides of a substrate aluminum foil, and additional application of a biocompatible lipid-based non-stick sealant layer to the outer metal layer.

BACKGROUND

Aluminum foil is commonly fabricated from aluminum ingots, which are heated and compressively rolled into thin metal leaves having a general thickness range of a few thousandths to a few tenths of a millimeter. This process affects the microstructure of the metal, for example by pulling the axis of the aluminum crystallites, or grains, in the direction in which the metal is rolled. The resulting grain deformation and weakened microstructure of the metal from repeated application of compressive rolling forces fatigues the aluminum and leaves it susceptible to both intergranular and extragranular corrosion. In particular, the surface of aluminum foil produced in the traditional manner is replete with surface voids, microstructural gaps, and other irregularities, all of which represent potential corrosion sites. Indeed, foil thinner than about 0.025 mm may even have minute pinholes caused by the production process (as a reference, most aluminum foils produced for culinary use are between about 0.010 and 0.030 mm thick).

The end result of a corrosion reaction involves a metal atom being oxidized, whereby it loses one or more electrons and leaves the bulk metal. Metals may (and frequently do) corrode on contact with water and/or ambient moisture, acids, bases, salts, various gases, and some oils. Many of these substances are contained in various foods.

if left in an environment with sufficient ambient moisture, the surface of raw aluminum foil will typically oxidize and form a thin layer of aluminum oxide. Although this layer may protect the foil from further corrosion, it also may react with acids to form aluminum salts. Corrosion and other reactions may be enhanced in the presence of directly or indirectly applied heat, such as in cooking applications.

Corrosion and other chemical reactions resulting in the formation of aluminum compounds is a problem in culinary applications for many reasons. One problem is the formation of corrosion and other reaction byproducts and subsequent deposit on food with which aluminum foil is used. Depending on the corrosive agent, the departing metal atoms, referred to herein as radicals, may be in the form of different compounds. For example, when aluminum foil comes into contact with food ingredients such as salt, or vinegar, or acidic foods such as tomatoes, aluminum salts form and deposits on the food.

Another problem is mechanical disintegration. The corrosion process may itself leave small holes in the foil, making it susceptible to tearing. In addition, mechanical stress to aluminum foil in many culinary applications, for example from food adhering to the foil surface, and/or abrasion from utensils, may also result in tearing the foil, and possibly transferring bits of the foil to the food during use.

Although the toxicity of aluminum and aluminum salts is generally not considered to be harmful to healthy humans in small quantities, many studies indicate that aluminum and aluminum-containing compounds are not particularly beneficial. For example, aluminum toxicity is recognized in many settings where exposure is heavy or prolonged, or in certain medical conditions such as limited renal function. There are over 2000 references in the National Library of Medicine on adverse effects of aluminum. Regardless of toxicity concerns, however, it is believed that many individuals would prefer not to have to remove conspicuous aluminum foil reaction products, and/or bits of degraded aluminum foil, from their food before eating it.

One approach to the corrosion problem include anodizing aluminum foil, but this process is generally unsuitable for culinary applications: the anodization process typically requires a sealing process that uses toxic compounds (e.g. nickel salts or dichromates) and is otherwise ineffective to block aluminum radical formation. As such, most culinary aluminum foil is raw (not anodized). Another approach is the use of aluminum-based alloys in order to reduce porosity, such as the process disclosed in U.S. Pat. No. 5,466,312 to Ward, but even if this method decreases the amount of potential corrosion sites, it likewise does not block aluminum radical formation at the remaining corrosion sites. Recent approaches involve applying a non-stick coating to culinary aluminum foil, such as U.S. Pat. No. 6,423,417, 6,544,658, and 6,696,511, all to Robbins, but the disclosed methods generally involve toxic curing agents and require additional process steps to properly cure the coating, and do not address the underlying problem of preventing corrosion from occurring. Further, the disclosed coatings are either silicone-based, or polymers, neither of which has a strong commercial appeal among consumers who prefer using natural lipid-based products, such as vegetable cooking oils, for lubricity.

The disclosures of the patents mentioned above are incorporated herein by reference.

SUMMARY

The present disclosure provides illustrative methods of producing corrosion-inhibiting aluminum foil products suitable for culinary use that involve metallurgical sequestration of aluminum radicals in aluminum foil by means of the application of one or more barrier metal layers, including a copper layer, to one or both sides of a substrate aluminum foil. In some methods, a pretreatment step involves a zincate process to prepare the aluminum foil substrate for plating, such as a double zincate method, or a zincating step followed by immersion tinning. The plating step may include depositing a foundation barrier layer, such as a thin layer of copper applied by means of a copper strike process, and/or a layer of nickel applied by an electroless plating process, to one or both sides of the substrate aluminum foil, followed by copper plating.

The present disclosure further provides illustrative methods of applying a biocompatible, lipid-based sealant layer to the copper layer on one or both sides of the metal-plated aluminum foil, and illustrative sealant layer compositions. The sealant layer seals any gaps in the copper barrier layer. The sealant layer may provide, among other features, a biocompatible non-stick coating to the plated aluminum foil. The sealant layer may also function as a natural antimicrobial and/or anti-fungal agent, such as in food storage applications. In some embodiments, the sealant composition includes a vegetable cooking oil, or oil mixture, as a primary ingredient. Examples of suitable vegetable cooking oils include avocado oil, the oil of a member of the plant genus *Brassica*, such as canola oil, and so forth. The sealant composition may further include a selenium additive such as sodium selenate, to increase the thermal stability of the oil and permit higher cooking temperatures. The sealant composition may optionally include an essential oil of *Brassica napus*, to enhance or impart biocompatible, antibacterial properties to the sealant. In some methods, the sealant is applied directly to one or both surfaces of the metal-plated aluminum foil by spray dry microencapsulation. In some methods, the sealant may be dispersed in a wetting agent and applied to one or both surfaces of the metal-plated aluminum foil by any suitable coating method.

Illustrative embodiments of aluminum foil products produced in accordance with the methods disclosed herein include a coated aluminum foil having a substrate layer of aluminum foil, a barrier layer deposited on the substrate layer composed of a copper layer, or some combination of copper, zinc, and nickel layers, and a natural, lipid-based sealant layer applied to the barrier layer. In some embodiments, the coated aluminum foil is coiled around a hollow tube. Such embodiments may further include a desiccant contained within the hollow tube, which in turn may be sealed within a volume formed between a pair of air-permeable membranes disposed within or at either end of the tube.

DETAILED DESCRIPTION

The present disclosure relates to methods of producing a corrosion-inhibiting aluminum foil product for culinary use by metallurgic sequestration of aluminum radicals in aluminum foil, followed by application of a sealant layer. Metallurgic sequestration is accomplished by application of one or more barrier metal layers containing copper applied to one or both sides, or surfaces, of the substrate foil, which binds the aluminum with a metal in which it is insoluble, thereby retarding intergranular aluminum corrosion processes in the weakened grain microstructure resulting from traditional foil manufacturing processes, and also prevents aluminum radical release from the aluminum foil substrate during use.

A sealant layer is then applied to one or both sides, or surfaces, of the metal plated aluminum foil, to seal any pores in the exterior copper barrier surface, thereby preventing galvanic corrosion at such sites if the substrate foil is exposed to electrolytic substances such as acid, salt, water, and so forth. Use of a natural, lipid-based sealant, for example one that includes one or more vegetable cooking oils (such as canola oil, avocado oil, etc.) as the primary ingredient, provides a biocompatible non-stick treatment to the outer copper surface. As described in greater detail below, the sealant may be supplemented with various substances to achieve additional features, such as the release of nutritionally beneficial minerals in trace amounts when heated, increased thermal stability (i.e., a higher temperature smoke point) of the sealant, extended shelf life, and antibacterial and mold-retardant properties.

Figure 1:
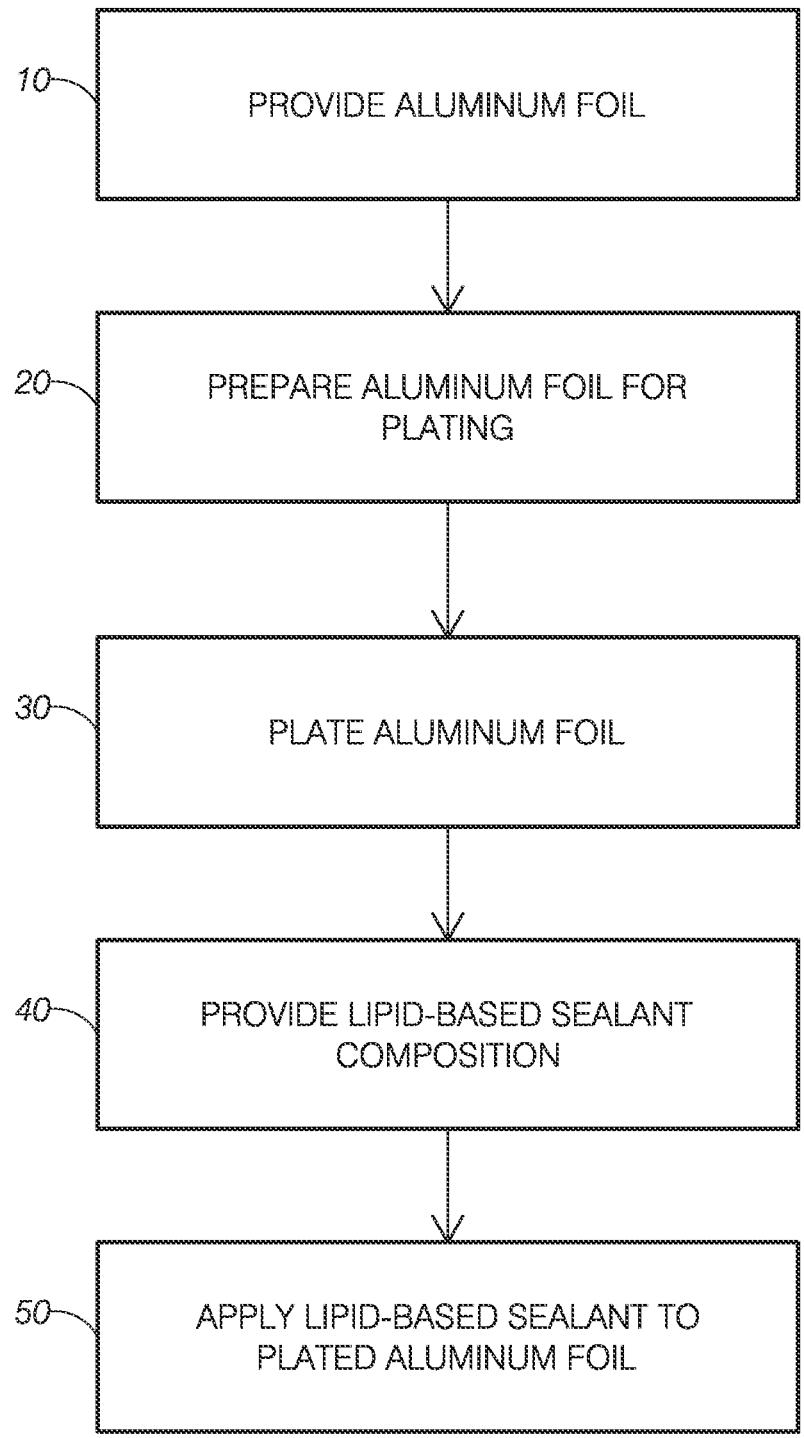
FIG. 1 is a schematic flow diagram showing an illustrative processing sequence for producing a treated aluminum foil product in accordance with the present disclosure.

FIG. 1 shows an illustrative processing sequence for producing a treated aluminum foil product, which is corrosion-resistant, in accordance with the present invention. The illustrative processing sequence is shown to include a series of blocks, each of which may further include one or more processes, methods, and/or steps. Moreover, the processes, methods, and/or steps represented by the blocks of FIG. 1 are not necessarily discrete from each other, or must occur in the order presented. Rather, the illustrative methods are discussed herein and defined by the claims appended hereto, and are intended to include all of the non-obvious variations of those disclosed in more detail below.

In an illustrative method of applying a sealed coating to an aluminum foil substrate, an aluminum foil is provided, according to block 10. The foil may be a commercially available culinary or cooking aluminum foil, for example any of the various REYNOLDS WRAP® products, which are typically sold in the form of a continuous sheet wound in a coil. For the sake of explanation, the illustrative methods discussed herein assume that the substrate foil is provided in a continuous sheet, but the various steps and processes may be modified to accommodate a substrate foil in other forms, such as strips or leaves.

Most aluminum foils, including those marketed for culinary uses, are coated or otherwise treated with a petroleum-based lubricant during the production process. As such, the method includes, as a preliminary step of preparing the substrate foil for plating, cleaning the foil substrate, for example by a degreasing process (such as by alkaline cleaning) after which the foil may be soak cleaned, and then rinsed.

Preparation of the aluminum foil substrate for plating, according to block 20, is accomplished in the illustrative method by means of a zincating method, in which an immersion zincate coating is applied to the cleaned aluminum foil surface. A detailed summary of the zincating process may be found, for example, in U.S. Pat. No. 4,364,128 to Loch, or U.S. Pat. No. 3,216,835 to Saubestre, the disclosures of which are incorporated herein by reference for all purposes. In the conventional zincating process, cleaned aluminum may first be etched to eliminate solid impurities and allowing constituents which might create voids resulting in bridging of subsequent deposits, and/or de-smutted to remove metallic residues and any aluminum oxides still remaining on the surface. This may be done, for example, in a bath containing 50% nitric acid. After a water rinse, the zincate coating is then applied using an immersion zinc bath. The amount of zinc deposited depends on the time and type of immersion bath used, the alloy, the temperature of the solution, and the pretreatment process. On a chemical level, the zincate solution plates the aluminum substrate with zinc via displacing zinc from the zincate solution by aluminum. The zinc coating bath also functions as an etching solution, and any oxides reformed during transferring operations are dissolved by the alkaline zincate while depositing zinc onto the aluminum.

Some methods include a double zincating procedure, which proceeds by removing at least part of the zincate coating by immersion in a nitric acid bath, followed by application of a second immersion zinc deposit. Double zincating is a preferred method for plating aluminum and is especially useful on difficult-to-plate alloys, and generally provides better adhesion of the final metal layer deposit. However, double zincating is not essential to all embodiments; the illustrative method may, instead of a second immersion zinc deposit, employ an immersion tinning process, which deposits a copper-tin (bronze) layer.

In block 30, the zincated aluminum foil is plated with a barrier layer that includes copper. The "barrier layer" may itself consist of several metal layers, such as multiple layers of copper, or copper in combination with other metals, depending on the plating process used. The illustrative method accomplishes the barrier layer deposition via copper electroplating, but any suitable copper deposition technique may be employed. In a copper electroplating process, superior copper adhesion to the aluminum (or zincated aluminum) substrate may be achieved by first employing a preliminary copper strike technique, in which a very thin layer of electroplated copper is applied using a high current density and a bath with a low ion concentration in a slow process that results in a high quality base plate with good adherence to the substrate. The base plate may then serve as a foundation layer for further metal layer deposition, such as via copper electroplating. For continuous roll plating, the copper strike technique typically involves, after rinsing, immersion in a copper strike tank (followed by rinsing, then followed by additional plating steps). An alternative, or additional, preliminary step in a copper electroplating process involves an electroless nickel plating technique. For example, a mildly acidic electroless nickel plating bath allows bridge-free deposition of nickel on the aluminum substrate (or copper base plate), which may in turn function as a (additional) foundation layer for further metal deposition, such as via copper electroplating.

Regardless of the preliminary plating technique(s) used, the plating step of the illustrative method typically concludes with a copper electroplating method in which a barrier layer of copper is deposited on the plated foil. Any suitable copper electroplating method may be used. Such methods may be classified on the basis of the complexing system utilized (including alkaline-(several modifications of cyanide and non-cyanide) complexed bath, acid-(sulfate and fluoroborate) complexed bath, mildly alkaline-(pyro phosphate) complexed bath, and so forth). The complexing system may, to some extent, be determined by the preparation technique. For example, if zincating is followed by immersion tinning, a copper cyanide plating solution may be employed.

One the barrier layer is fully applied, block 40 involves providing a sealant for application to the barrier layer. The sealant composition in the illustrative embodiment is natural and lipid-based, meaning that a vegetable cooking oil (or combination of two or more vegetable cooking oils) constitutes the primary ingredient. The term "vegetable cooking oil," as used herein, refers to a fat of plant origin that is edible by humans. The use of a natural, lipid-based sealant provides a food-based, biocompatible non-stick treatment to the copper surface of the plated aluminum foil, due to the inherent lubricity of the oil or oil composition, while simultaneously sealing any pores in the copper barrier. As such, the lipid base of the sealant protects the barrier plating by reducing the exposure of the plating surface to chemical reactions of oxidation and corrosion. The lubricity of the sealant protects the integrity of the barrier plating by reducing physical stress on the plating surface due to friction, or abrasion, such as by cooking utensils, and reduces food adhesion during cooking, as well as during packaging/wrapping and storing of foods.

Moreover, certain vegetable cooking oils, such as avocado oil, oils from members of the *Brassica* plant genus (for example, canola oil, mustard oil, etc.), and so forth, are naturally antimicrobial (i.e., antibacterial) and antifungal, properties that are desirable in culinary applications, especially when the foil substrate to which the oil-containing sealant is applied is used for food storage. In addition, avocado oil and several *Brassica* oils have a neutral taste, and are thermally stable at high cooking temperatures. For example, the smoke point of avocado oil is approximately 520° F. (271° C.), which is higher than the maximum temperature setting of most conventional ovens. The smoke point of canola oil is approximately 465-475° F. (240-246° C.).

Canola oil is one of several *Brassica* oils which include natural isothiocyanates, substances shown to have certain health benefits such as chemoprevention against the development and proliferation of cancers. When used as an ingredient in a sealant applied to the copper barrier surface of the substrate foil and subjected to heat, some isothiocyanates react with the copper barrier layer to release copper sulfate, a nutritionally beneficial mineral.

The sealant may optionally include one or more additives or supplements to achieve additional features beneficial in culinary applications. For example, the thermal stability of isothiocyanate-containing vegetable cooking oils, such as *Brassica* oils, may be increased by adding selenium, or a selenium-containing compound such as sodium selenate, to the sealant in a concentration sufficient so that selenium displaces sulfur in the isothiocyanate groups. In experiments, a concentration of approximately 200 mcg per square yard of plated aluminum foil surface achieved an increase in the smoke point of canola oil to over 500° F. It has also been discovered that a selenium additive inhibits oxidation of canola oil in the absence of heat, and extends the shelf life of the sealant. Optionally, the antibacterial, mold-retardant, and release (i.e. non-stick) properties of the vegetable cooking oil(s) of the sealant may be augmented, or enhanced, with the addition of an essential oil of *Brassica napus*.

Still other types of additives may have benefits additional or cumulative to those listed above. For example, a stabilizer, such as in the form of an antioxidant (or combination of antioxidants), e.g. tocopherols, polyphenols, ascorbic acid, etc., or other natural or suitable synthetic compound, may be added to the sealant, such as to stabilize the composition against separation, as well as increase sealant adhesion to the substrate, and provide resistance to oxidative rancidification. In further examples, aluminum chelates soluble in lipid or in water are employed.

In the illustrative method, the step of providing a sealant may involve preparing the sealant composition by mixing the ingredients of the sealant composition and optionally diluting the mixture, such as with a solvent, to a desired concentration of sealant components. In some examples, the sealant composition, or components of the sealant composition, is microencapsulated, emulsified, dispersed, or formed into a colloid. Optionally, components of the sealant composition may be provided separately, such as for separate, progressive application to the plated substrate foil. The step of providing a sealant may, if desired, include additional processing steps.

For example, a steam sparging process may be employed to refine the oil or oils of the composition, and/or to neutralize the taste and/or odor of the mixture. Additionally, by refining, the thermal stability of the oil mixture is usually improved. Another example of an additional processing step that the illustrative method may employ is partial hydrogenation of the oil, or oil mixture, which may, in addition to changing the physical characteristics of the mixture (e.g., its melting point, smoke point, adhesion, hardness, etc.), may also further protect against oxidation.

The desired concentration, and other properties, of the sealant composition may be dictated by the application method (or methods), the desired thickness of the coating as applied to the plated aluminum foil, the desired tactile character of the coated foil surface, and so forth. Moreover. For example, improved adhesion to the outer layer of the plated foil of the sealant (and incidental higher temperature lubricity) may be achieved by spraying a dispersion of the sealant in a wetting agent, such as food-grade glycerol, directly onto the plated foil substrate. Optionally, an aqueous emulsion of the sealant may be applied by direct spraying. The illustrative method may alternatively employ spray dry microencapsulation as an application technique, by which a dry feel of the coated surface may be achieved. In such a technique, the lipid-based sealant may be enveloped in an autologous coating (such as made up of its own wax crystal, glycol fraction, etc.), or may be encapsulated in a food grade substance suitable for the spray dry process. Other alternative application techniques include dipping, use of a gravure cylinder, and so forth.

In block 50, the sealant composition is applied to one or both sides of the plated aluminum foil by a suitable process, such as those mentioned above. This process may involve several successive application steps. For example, like the "barrier layer," the "sealant layer" may itself include two or more applications of separate sealant components or compositions, and/or repeated applications of sealant components or compositions, and such applications may be performed by different or repeated techniques, including any combination of techniques such as microencapsulation, spray and/or dip application of an emulsion, dispersion, colloid, etc., and so forth. The illustrative method may further include one or more post-application drying and/or heating steps, depending on the application method and/or desired tactile character of the sealed surface.

Once the sealant is applied to the plated aluminum foil, the illustrative method may include further processing steps as desired, such as to prepare the coated foil for commercial distribution as a product. In one example, the coated aluminum foil may be stamped or otherwise formed into a container for food, with the resulting container formed out of the foil product alone or in combination with other materials (such as a rigid backing). In an example in which the aluminum foil substrate is in the form of a continuous sheet, the coated foil may be wound in a coil around a hollow tube in a standard manner.

Several of the materials used in the aforementioned methods of producing the coated aluminum foil (such as copper, the vegetable cooking oil(s) of the sealant, essential oil additives) have a long-term shelf life and service durability that may be further improved by storage in a dry environment. As such, an example product may incorporate a desiccant or similar agent, and/or packaging, to create a low-moisture storage environment.

Figure 2A:
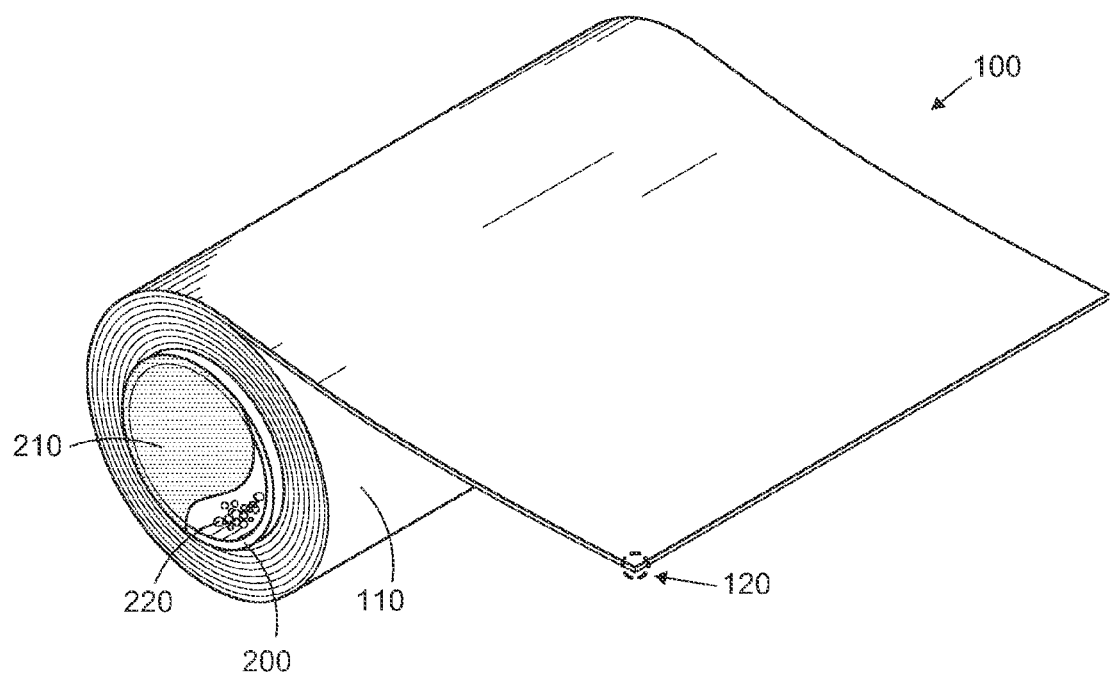
FIG. 2A shows a view of a treated aluminum foil product produced in accordance with the present disclosure.
Figure 2B:
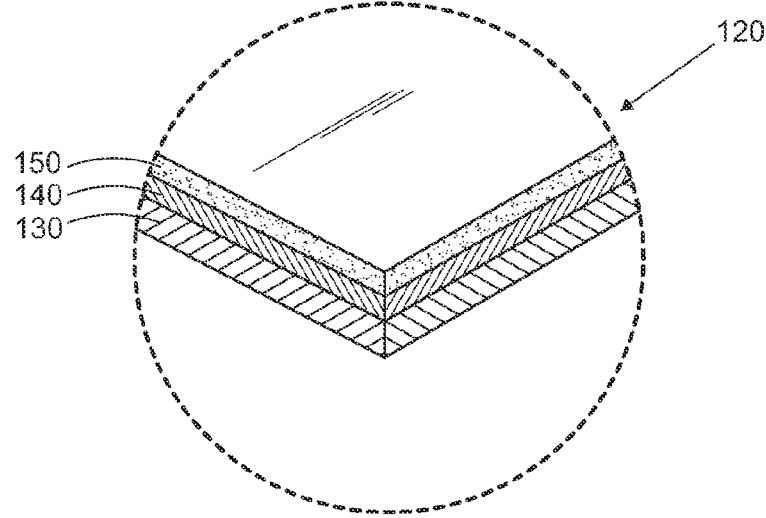
FIG. 2B shows a schematic cross-sectional view of the sheet of coated aluminum shown in FIG. 2A showing the various layers thereof.

Accordingly, an example aluminum foil product, such as that shown in FIG. 2A and generally indicated at 100, includes a coil of coated aluminum foil 110. The coated aluminum foil 110 is produced according to the illustrative methods discussed herein, and schematically shown to include multiple layers 120 in FIG. 2B. Although the scale of the layers represented in FIGS. 2A and 2B is exaggerated, and the relative thicknesses thereof are shown to be comparatively consistent, for the purpose of illustration, coated aluminum foil 110 is shown to include a substrate layer 130 of aluminum foil, a copper-containing harder layer 140, and a natural, lipid-based sealant layer 150. Of course, the coated aluminum foil may include two barrier layers 140, and/or two sealant layers 150, for example on both sides of the aluminum foil substrate.

The coated aluminum foil is shown to be wound in a coil around a hollow tube 200, which is shown to be sealed at either end by means of a semipermeable (i.e., permeable to moist air) membrane 210. As such, the tube 200 and membranes 210 collectively define a sealed volume in which a food-grade desiccant 220 is contained. Optionally, membranes 210 may be disposed at any point within the tube in order to create a volume to contain the desiccant 220, and some embodiments may include several membranes forming multiple desiccant-containing chambers within the tube. Although not shown, the aluminum foil product 100 may be packaged in an airtight, food grade dispenser or other container.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A method of applying a corrosion-inhibiting coating to an aluminum foil substrate, the method comprising:
   cleaning a surface of a substrate aluminum foil;
   applying an immersion zincate coating to the cleaned aluminum foil surface by immersing the aluminum foil in a zincate solution comprising an effective amount of zinc ions to be displaced from the solution by aluminum;
   depositing a barrier layer containing at least one copper layer on the zincated aluminum foil surface; and
   applying a natural, lipid-based sealant layer to the barrier layer sufficient to seal any pores in the barrier layer.

2. The method of claim 1, wherein applying an immersion zincate coating is performed by a double zincate method that further includes, subsequent to immersing the aluminum foil in a zincate solution, immersing the zincated aluminum foil in a nitric acid bath to remove at least part of the zincate coating, followed by immersing the aluminum foil in a second zincate solution also comprising an effective amount of zinc ions to be displaced from the solution by aluminum, to zincate the aluminum and metal plating of the zincated aluminum foil surface.

3. The method of claim herein depositing copper layer is performed using a copper electroplating process.

4. The method of claim 3, wherein the copper electroplating process includes a preliminary step in which the zincated aluminum foil is plated with a base layer of copper using a copper strike technique.

5. The method of claim 3, wherein the copper electroplating process includes a preliminary step in which the zincated aluminum foil is plated with a base layer of nickel using an electroless plating technique.

6. The method of claim 1, wherein the natural, lipid-based sealant applied as the sealant layer includes a vegetable cooking oil containing a sufficient amount of isothiocyanates to react, when heated, with the copper layer of the plated aluminum foil surface, to form copper sulfate.

7. The method of claim 6, wherein the vegetable cooking oil includes an oil of a member of the plant genus *Brassica*.

8. The method of claim 7, wherein the vegetable cooking oil includes canola oil.

9. The method of claim 6, further including, prior to applying the sealant layer to the plated aluminum foil surface, adding a quantity of selenium salt to the lipid-based sealant in a concentration sufficient to displace enough sulfur atoms from the isothiocyanates in the vegetable cooking oil to raise the smoke point of the vegetable cooking oil.

10. The method of claim 9, wherein the vegetable cooking oil is canola oil, wherein the selenium salt is sodium selenate, and wherein the concentration of sodium selenate is approximately 200 mcg per square yard of plated aluminum foil surface.

11. The method of claim 7, wherein the vegetable cooking oil includes avocado oil.

12. The method of claim 1, further including, prior to applying the sealant layer to the plated aluminum foil surface, supplementing the lipid-based sealant with an essential oil of *Brassica napus*.

13. The method of claim 1, wherein the aluminum foil substrate is a continuous roll of aluminum foil.

14. The method of claim 13, wherein the aluminum foil substrate is a continuous roll of culinary-grade aluminum foil.

15. The method of claim 1, wherein applying the sealant layer is performed by spray dry microencapsulation.

16. An aluminum foil product, comprising:
   coated aluminum foil having:
      a substrate layer of aluminum foil, having a top surface and a bottom surface;
      a copper-containing barrier layer deposited on at least the top surface; and
      a natural, lipid-based sealant layer applied to at least the copper-containing barrier layer.

17. The aluminum foil product of claim 16, further comprising a hollow tube around which the coated aluminum foil is wound in coil form.

18. The aluminum foil product of claim 17, wherein the hollow tube includes two air-permeable membranes disposed to define a sealed volume within the hollow tube, and wherein the aluminum foil product further comprises a desiccant contained within the sealed volume.

19. The aluminum foil product of claim 16, wherein the coated aluminum foil in formed into a rigid food container.

20. A method of producing a corrosion-inhibiting, antibacterial, mold-retarding, adhesion-resistant coating on an aluminum foil substrate, the method comprising:
   cleaning a surface of a substrate aluminum foil;
   preparing the cleaned aluminum foil surface for a copper layer deposition by applying a double zincate method that includes immersing the aluminum foil in a zincate solution, immersing the zincated aluminum foil in a nitric acid bath to remove at least part of the zincate coating, further immersing the aluminum foil in a second zincate solution to zincate the aluminum and metal plating of the zincated aluminum foil surface;
   depositing a copper-containing barrier layer on the zincated aluminum foil surface using a preliminary step that involves depositing a foundation metal layer by means of one or more of an copper strike technique and an electroless nickel plating technique, followed by electroplating the foundation metal layer with copper;
   providing a natural, lipid-based sealant composition having avocado oil as the primary ingredient;
   supplementing the sealant composition with one or more of an essential oil of *Brassica napus* in a concentration sufficient to augment the antibacterial or mold-retarding properties of avocado oil and a selenium salt in a concentration sufficient to raise the smoke point of avocado oil; and
   applying the sealant composition as a sealant layer to the plated aluminum foil surface by spray dry microencapsulation.

* * * * *